(12) United States Patent
Xu

(10) Patent No.: US 10,514,514 B2
(45) Date of Patent: Dec. 24, 2019

(54) BACKLIGHT MODULE AND DISPLAY DEVICE

(71) Applicant: WUHAN CHINA STAR OPTOELECTRONICS TECHNOLOGY CO., LTD., Wuhan, Hubei (CN)

(72) Inventor: Pengbo Xu, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 56 days.

(21) Appl. No.: 15/571,164

(22) PCT Filed: Jun. 22, 2017

(86) PCT No.: PCT/CN2017/089619
§ 371 (c)(1),
(2) Date: Nov. 1, 2017

(87) PCT Pub. No.: WO2018/205364
PCT Pub. Date: Nov. 15, 2018

(65) Prior Publication Data
US 2018/0329134 A1    Nov. 15, 2018

(30) Foreign Application Priority Data

May 12, 2017    (CN) .......................... 2017 1 0334623

(51) Int. Cl.
*G02B 6/42* (2006.01)
*F21V 8/00* (2006.01)
(Continued)

(52) U.S. Cl.
CPC .......... *G02B 6/4251* (2013.01); *G02B 6/0031* (2013.01); *G02F 1/133615* (2013.01);
(Continued)

(58) Field of Classification Search
CPC ............ G02F 1/133615; G02B 6/0031; G02B 6/0025; G02B 6/4251; G02B 6/003;
(Continued)

(56) References Cited

U.S. PATENT DOCUMENTS 9,086,595 B2 * 7/2015 Takemura ................. F21S 2/00
2008/0170172 A1 * 7/2008 Okuda .............. G02F 1/133512
349/59
(Continued)

*Primary Examiner* — Erin Kryukova
(74) *Attorney, Agent, or Firm* — Hauptman Ham, LLP

(57) ABSTRACT

A backlight module includes a light guide plate (LGP) comprising an incident surface, an emergent surface, and a reflective surface, a reflecting plate, a diffuser, a prismatic lens group, a rim tape layer, a light source, and a shading layer. The shading layer corresponds to an incident surface of the diffuser. The shading layer comprises a middle portion and side portions separated from the middle portion, and a length of the middle portion is greater than lengths of the side portions. Each of the side portions are fixed on two sides to the diffuser and the rim tape layer, respectively. The middle portion is fixed on only one side, the one side of the middle portion being fixed to the rim tape layer.

18 Claims, 3 Drawing Sheets

(51) Int. Cl.
  *G02F 1/1335* (2006.01)
  *H04M 1/02* (2006.01)
  *G02F 1/13357* (2006.01)

(52) U.S. Cl.
  CPC .......... *G02B 6/0051* (2013.01); *G02B 6/0053* (2013.01); *G02B 6/0055* (2013.01); *G02B 6/0085* (2013.01); *H04M 1/0277* (2013.01)

(58) Field of Classification Search
  CPC .. G02B 6/0055; G02B 6/0053; G02B 6/0051; G02B 6/0085; H05B 33/0803; H04M 1/0277
  See application file for complete search history.

(56) References Cited

U.S. PATENT DOCUMENTS

| | | | | |
|---|---|---|---|---|
| 2010/0328580 | A1* | 12/2010 | Kim | G02B 6/0073 349/64 |
| 2011/0058121 | A1* | 3/2011 | Yabe | G02B 6/002 349/62 |
| 2011/0122651 | A1* | 5/2011 | Komano | G02B 6/002 362/611 |
| 2012/0002441 | A1* | 1/2012 | Yabe | G02B 6/002 362/607 |
| 2014/0240639 | A1* | 8/2014 | Jung | G02F 1/133615 349/60 |
| 2016/0116786 | A1* | 4/2016 | Lee | G02F 1/133615 349/58 |

* cited by examiner

BACKLIGHT MODULE AND DISPLAY DEVICE

CROSS REFERENCE TO RELATED APPLICATION

This application claims the priority of Chinese Patent Application No. 201710334623.6 filed on May 12, 2017, in the State Intellectual Property Office, the disclosure of which is incorporated herein by reference. Further, this application is the National Phase application of International Application No. PCT/CN2017/089619 filed Jun. 22, 2017, which designates the United States.

BACKGROUND OF THE INVENTION

1. Field of the Invention

The present disclosure relates to the field of display technology, and more particularly to a backlight module and a display device.

2. Description of the Prior Art

Current mobile phone modules are getting thinner, and film warping after reliability (RA) verification (process where products are molded, and the molded products are subjected to reliability tests in harsh environments, such as high temperature, high humidity) has become a concern, which often relates to whether the module can be mass produced.

The warping problem mostly relates to diffusers, because after RA verification, the diffusers are easily warped.

SUMMARY OF THE INVENTION

The aim of the present disclosure is to provide a backlight module and a display device capable of solving the issue that warping appears in the diffuser after reliability (RA) verification.

The present disclosure provides a backlight module comprising:

a light guide plate (LGP) comprising an incident surface, an emergent surface, and a reflective surface;

a reflecting plate arranged on the reflective surface of the LGP to reflect light rays transmitted by the LGP to the emergent surface of the LGP;

a diffuser arranged on the emergent surface of the LGP to diffuse emergent light of the LGP;

a prismatic lens group arranged on an emergent surface of the diffuser;

a rim tape layer arranged around the emergent surface of the LGP;

a light source arranged on the incident surface of the LGP;

a flexible printed circuit board electrically connected to the light source to control the light source; the flexible printed circuit board is arranged between the light source and the rim tape layer;

a sealant arranged on an outside of the source light; a first side of the sealant is fixed to an edge of the reflecting plate, and a second side of the sealant is fixed to an edge of the rim tape layer; and a shading layer arranged between the diffuser and the rim tape layer, and arranged on an outside of the prismatic lens group. The shading layer corresponds to an incident surface of the diffuser. The shading layer comprises a middle portion and side portions separated from the middle portion, a length of the middle portion is greater than lengths of the side portions. Each of the side portions are fixed on two sides to the diffuser and the rim tape layer, respectively. The middle portion is fixed on only one side, the one side of the middle portion being fixed to the rim tape layer. The side portions comprise a first side portion and a second side portion arranged on two sides of the middle portion, respectively. The side portions correspond to edges of the diffuser. A glue layer is disposed on a side of the side portions corresponding to the diffuser, and fixes and adheres to the diffuser. One of separation lines is arranged between the middle portion and one of the side portions, and a projection is arranged on a side of the separation line to block light rays.

The present disclosure further provides the backlight module comprising:

a light guide plate (LGP) comprising an incident surface, an emergent surface, and a reflective surface;

a reflecting plate arranged on the reflective surface of the LGP to reflect light rays transmitted by the LGP to the emergent surface of the LGP;

a diffuser arranged on the emergent surface of the LGP to diffuse emergent light of the LGP;

a prismatic lens group arranged on an emergent surface of the diffuser;

a rim tape layer arranged around the emergent surface of the LGP;

a light source arranged on the incident surface of the LGP;

a flexible printed circuit board electrically connected to the light source to control the light source; the flexible printed circuit board is arranged between the light source and the rim tape layer, a sealant arranged on an outside of the source light; a first side of the sealant is fixed to an edge of the reflecting plate, and a second side of the sealant is fixed to an edge of the rim tape layer; and a shading layer arranged between the diffuser and the rim tape layer, and arranged on an outside of the prismatic lens group. The shading layer corresponds to an incident surface of the diffuser. The shading layer comprises a middle portion and side portions separated from the middle portion, and a length of the middle portion is greater than lengths of the side portions. Each of the side portions are fixed on two sides to the diffuser and the rim tape layer, respectively. The middle portion is fixed on only one side, the one side of the middle portion being fixed to the rim tape layer.

In the backlight module of the present disclosure, the side portions comprise a first side portion and a second side portion arranged on two sides of the middle portion, respectively.

In the backlight module of the present disclosure, the side portions correspond to edges of the diffuser.

In the backlight module of the present disclosure, a glue layer is disposed on a side of the side portions corresponding to the diffuser, and fixes and adheres to the diffuser.

In the backlight module of the present disclosure, one or more cutting line along a long edge of the diffuser is arranged on the incident surface of the diffuser, and the diffuser is divided on each of two sides of the cutting line.

In the backlight module of the present disclosure, the shading layer is a black polyethylene terephthalate (PET) layer.

In the backlight module of the present disclosure, one of separation lines is arranged between the middle portion and one of the side portions, and a projection is arranged on a side of the separation line to block light rays.

In the backlight module of the present disclosure, the separation line is a bend line.

The present disclosure further provides a display device comprising any one of the above backlight modules.

In the display device of the present disclosure, the display device further comprises a display module connected the backlight module, where the display module comprises:

a first polarizer connected to the rim tape layer of the backlight module;

an array substrate connected to a side of the first polarizer away from the rim tape layer;

a color filter substrate connected to a side of the array substrate away from the first polarizer, and a second polarizer connected to a side of the color filter substrate away from the array substrate.

The present disclosure provides the backlight module and a phone module. In the backlight module, the shading layer comprises the middle portion and the side portions separated from the middle portion, and each of the side portions are fixed on two sides and connected to the diffuser and the rim tape layer, respectively. The middle portion is fixed on only one side, the one side of the middle portion being fixed to the rim tape layer, which makes the middle portion of the shading layer be not integrated with the diffuser. The expansion coefficient of the diffuser is different than the expansion coefficient of the shading layer, in high temperature or low temperature conditions, the diffuser and the shading layer are expanded or contracted to varying degrees, the middle portion of the shading layer is moved relative to the diffuser. Namely, the middle portion of the shading layer is slid relative to the diffuser, and a length of the middle portion is greater than lengths of the side portions. Thus, although the expansion coefficient of the shading layer and the diffuser in high temperature or low temperature conditions are different, and expansion length of the shading layer and the diffuser are different, the warping problem cannot appear in the shading layer and the diffuser. The above structural changes are small, and the original manufacturing process is not affected, extra components are not added, and costs are not affected.

DETAILED DESCRIPTION OF THE PREFERRED EMBODIMENTS

The description of the following embodiments with reference to the accompanying drawings is used to exemplify a specific embodiment, which may be carried out in the present disclosure. Directional terms mentioned in the present disclosure, such as "top", "bottom", "front", "back", "left", "right", "inside", "outside", "side" etc., are only used with reference to the orientation of the accompanying drawings. Therefore, the used directional terms are intended to illustrate, but not to limit, the present disclosure.

As shown in FIG. 1 to FIG. 5, components having similar structures are denoted by the same numerals.

Figure 1:
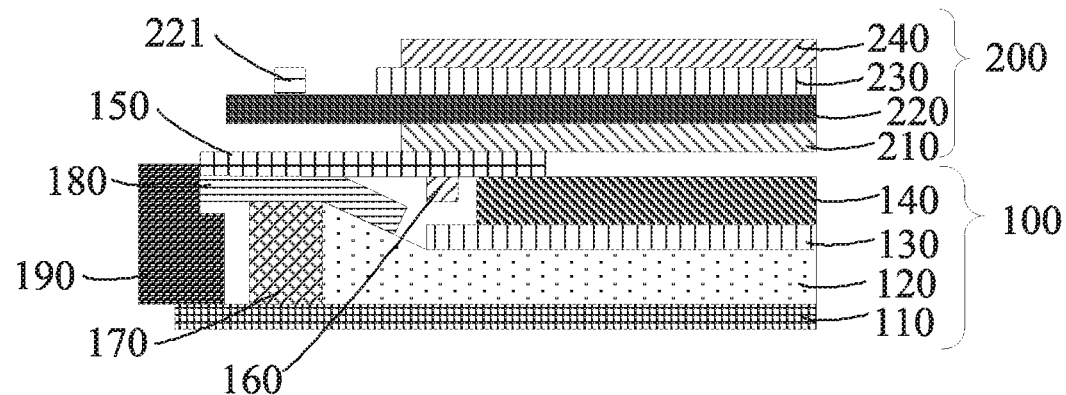
FIG. 1 is a structural diagram of a display device according to an embodiment of the present disclosure.
Figure 2:
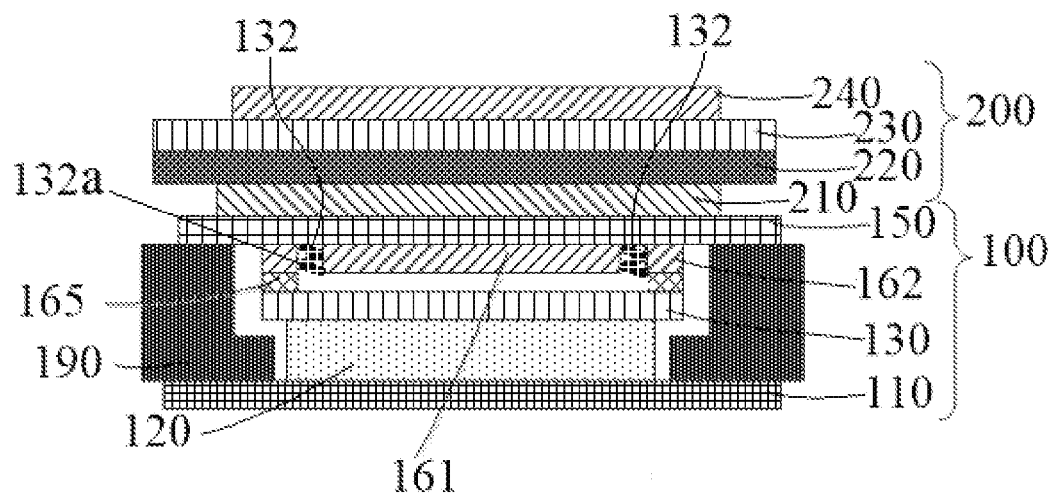
FIG. 2 is a sectional structural diagram of the display device according to the embodiment of the present disclosure.

As shown in FIG. 1 and FIG. 2, FIG. 1 is a structural diagram of a display device according to an embodiment of the present disclosure, and FIG. 2 is a sectional structural diagram of the display device according to the embodiment of the present disclosure.

The present disclosure provides a display device comprising a backlight module 100 and a display module 200 connected to the backlight module 100. The display module successively comprises a lower polarizer 210, an array substrate 220, a color filter substrate 230, and an upper polarizer 240. The lower polarizer 210 is connected to the backlight module 100, the array substrate 220 is connected to a side of the lower polarizer 210 away from the backlight module 100, the color filter substrate 230 is connected to a side of the array substrate 220 away from the lower polarizer 210, and the upper polarizer 240 is connected to a side of the color filter substrate 230 away from the array substrate 220. The array substrate 220 is further connected to a control chip 221. Two sides of the color filter substrate 230 can exceed the lower polarizer 210 and the upper polarizer 240, and width of the array substrate 220 is greater than or equal to width of the color filter substrate 230.

In the embodiment, the backlight module 100 successively comprises a reflecting plate 110, a light guide plate (LGP) 120, a diffuser 130, a prismatic lens group 140, and a rim tape layer 150. The backlight module 100 further comprises a light source 170, a flexible printed circuit (FPC) board 180 and a sealant 190. The LGP comprises an incident surface, an emergent surface, and a reflective surface, where the reflecting plate is arranged on the reflective surface of the LGP to reflect light rays transmitted by the LGP to the emergent surface of the LGP. The diffuser is arranged on the emergent surface of the LGP to diffuse emergent light of the LGP. The prismatic lens group is arranged on an emergent surface of the diffuser. The rim tape layer is arranged around the emergent surface of the LGP.

The prismatic lens group 140 is arranged between the diffuser 130 and the rim tape layer 150. The prismatic lens group 140 comprises a lower prismatic lens and an upper prismatic lens. The LGP 120 is connected to a side of the diffuser away from the rim tape layer 150. The reflecting plate 110 is connected to a side of the LGP 120 away from the rim tape layer 150. The light source 170 is arranged between a side of the reflecting plate 110 and a side of the rim tape layer 150, and is arranged on an outside of the LGP 120. The light source 170 can be a single-sided light source, and can also be a double-sided light source. The light source 170 can be a light emitting diode (LED). The flexible printed circuit board 180 is electrically connected to the light source 170 to control the light source 170, and the flexible printed circuit board 180 is arranged between the light source 170 and the rim tape layer 150. The sealant 190 is arranged on an outside of the source light 170, where a first side of the sealant 190 is fixed to an edge of the reflecting plate 110, and a second side of the sealant 190 is fixed to an edge of the rim tape layer 150 to seal the rim tape layer 150 and the reflecting plate 110. An optically clear adhesive also can be arranged on the rim tape layer 150.

Figure 3:
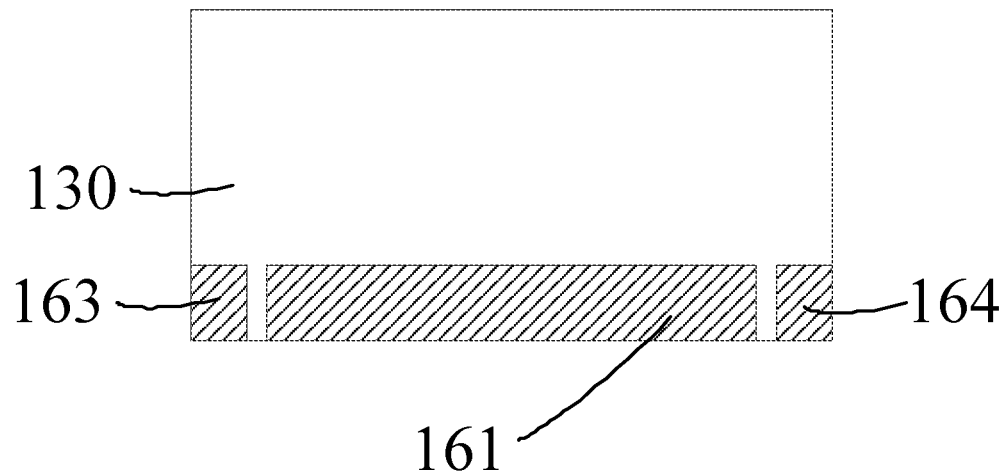
FIG. 3 is a structural diagram of a shading layer and a diffuser according to the embodiment of the present disclosure.
Figure 4:
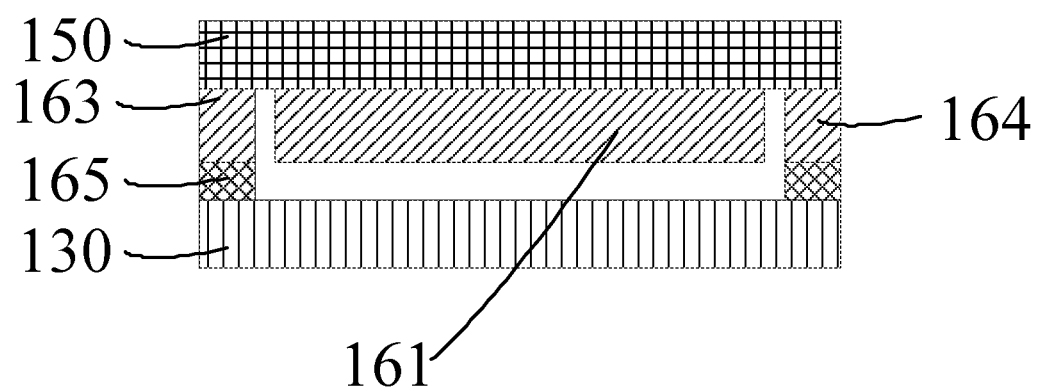
FIG. 4 is a structural diagram of the shading layer, the diffuser, and a rim tape layer according to the embodiment of the present disclosure.

Referring to FIG. 3 and FIG. 4, FIG. 3 is a structural diagram of the shading layer and the diffuser according to the embodiment of the present disclosure, and FIG. 4 is a structural diagram of the shading layer, the diffuser, and the rim tape layer. The backlight module of the present disclosure comprises the shading layer 160 arranged between the diffuser 130 and the rim tape layer 150, and arranged on an outside of the prismatic lens group 140. The shading layer 160 corresponds to an incident surface of the diffuser 130. The shading layer 160 comprises a middle portion 161 and side portions 162 separated from the middle portion 161, where a length of the middle portion 161 is greater than lengths of the side portions 162. Each of the side portions 162 are fixed on two sides to the diffuser 130 and the rim tape layer 150, respectively. The middle portion 161 is fixed on only one side, the one side of the middle portion being fixed to the rim tape layer 150. Expansion coefficient of the diffuser 130 is different than expansion coefficient of the shading layer 150.

The shading layer 160 comprises the middle portion 161 and the side portions 162 separated from the middle portion 161, and the shading layer 160 is not integrated with the diffuser 130, and Each of the side portions 162 are fixed on two sides and connected to the diffuser 130 and the rim tape layer 150, respectively, which avoids the diffuser from sliding. The middle portion 161 is fixed on only one side, the one side of the middle portion being fixed to the rim tape layer 150, which prevents the middle portion 161 of the shading layer 160 from being integrated with the diffuser 130. The expansion coefficient of the diffuser 130 is different than the expansion coefficient of the shading layer 150, and in high temperature or low temperature conditions, the diffuser 130 and the shading layer 160 expand or contract to varying degrees, and the middle portion 161 of the shading layer 160 is moved relative to the diffuser 130. Namely, the middle portion 161 of the shading layer 160 is slid relative to the diffuser 130, and length of the middle portion is greater than lengths of the side portions. Thus, although the expansion coefficients of the shading layer 150 and the diffuser 130 in high temperature or low temperature conditions are different, and expansion lengths of the shading layer 150 and the diffuser 130 are different, the warping problem cannot appear in the shading layer 150 and the diffuser 130. The above structural changes are small, and the original manufacturing process is not affected, extra components are not added, and cost is not affected. The shading layer 160 can be directly fixed and adhered to the rim tape layer 150 by a glue or double sided adhesive tape. The shading layer 160 can be fixed on only one side, the one side of the middle portion being fixed to the rim tape layer 150 by other means.

The shading layer 160 corresponds to the incident surface of the diffuser 130. Namely, the shading layer 160 corresponds to a side of the diffuser 130 close to the light source 170, which avoids the light rays entering the prismatic lens group from the side of the diffuser 130. The light source 170 can be the single-sided light source, and can also be the double sided light source. The shading layer 160 can be arranged on two sides of the diffuser 130 close to the double sided light source.

The shading layer 160 comprises the middle portion 161 and the side portions 162, where the side portions 162 are fixed on only one side, the one side of the middle portion being fixed to the rim tape layer 150 and the diffuser, respectively. The middle portion 161 is not adhered and is not fixed to the diffuser 130, and the middle portion 161 is separated from the diffuser 130. A first side of the middle portion 161 of the shading layer 160 is fixed on only one side, the one side of the middle portion being fixed to the rim tape layer 150, a second side of the middle portion 161 is not viscid, the second side of the middle portion 161 and the diffuser 130 are in a movable state, which blocks unnecessary light rays, and avoids hotspots from appearing. Contacted portions between the middle portion of the shading layer 160 and the diffuser 130 are not viscid. In the backlight module, the shading layer 160 is pressed on the diffuser 130. In high temperature or low temperature conditions, the diffuser 130 and the shading layer 160 expand or contract to varying degrees and the diffuser 130 is moved relative to the middle portion 161 of the diffuser 160 because of the lack of viscidity.

In the embodiment, the side portions comprise a first side portion 163 and a second side portion 164 arranged on two sides of the middle portion 161. The first side portion 163 and the second side portion 164 are fixed to the diffuser 130 and the rim tape layer 150, respectively. First sides of the first side portion 163 and the second side portion 164 are fixed on only one side, the one side of the middle portion being fixed to the rim tape layer 150, and second sides of the first side portion 163 and the second side portion 164 are fixed to the diffuser 130. The second sides of the first side portion 163 and the second side portion 164 are fixed to the edge of the diffuser, which prevents the diffuser 130 from sliding.

In the embodiment, the side portions 162 are arranged on the side of the diffuser 130 close to the light source. Length of the side portions 162 are far less than length of the middle portion 161, and are disposed on an edge of the backlight module, and at the position of the backlight module having low heat. The width of the side portions 162 is small, and the heat deformation is small, further not causing deformation of the diffuser.

In the embodiment, a glue layer 165 is disposed on the side of the side portions corresponding to the diffuser 130, and fixes and adheres to the diffuser. The side portions comprise the first side portion 163 and the second side portion 164 arranged on the two sides of the middle portion 161. The side portions are fixed and adhered to the diffuser 130. The glue layer 165 can be double sided adhesive tape, and can also be a colloid, or other sticky materials.

In the embodiment, the shading layer 160 is a black polyethylene terephthalate (PET) layer.

Figure 5:
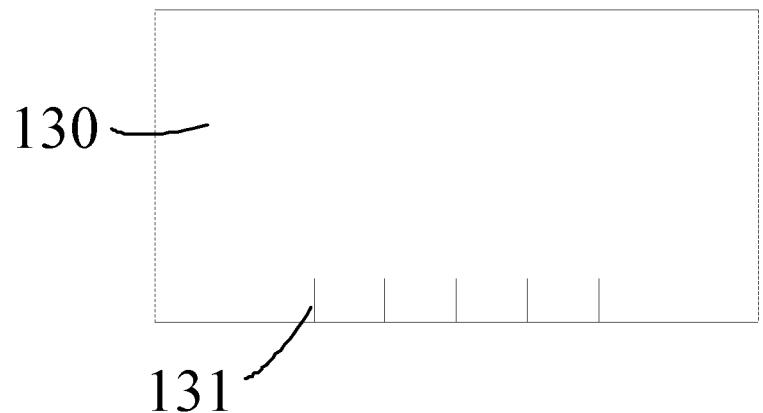
FIG. 5 is a structural diagram of a cutting line of the diffuser according to the embodiment of the present disclosure.
Figure 6:
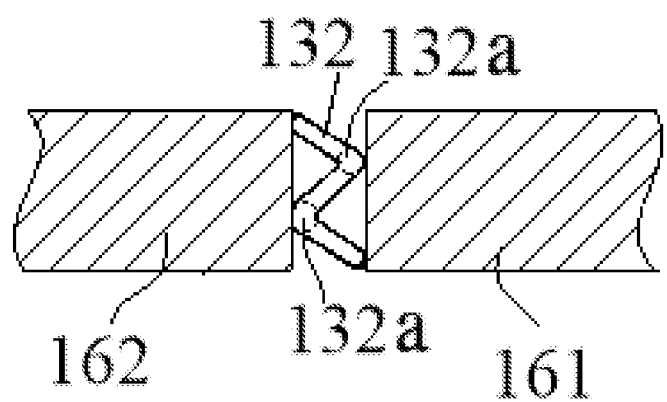
FIG. 6 is a structural diagram of a separation line according to the embodiment of the present disclosure.

FIG. 5 is a structural diagram of a cutting line of the diffuser according to the embodiment of the present disclosure. In the embodiment, one or more cutting line 131 along a long edge of the diffuser 130 is arranged on the incident surface of the diffuser corresponding to the light source, and the diffuser is divided on each of two sides of the cutting line, to release deformation of the diffuser 130 because of the heat source of the incident surface of the diffuser.

In the embodiment, one of separation lines 132 is arranged between the middle portion and one of the side portions, and a projection 132a is arranged on a side of the separation line 132 to block light rays. To be specific, the separation line 132 is a bend line. At a bendable position, the middle portion and/or the side portions protrudes toward the separation line 132 to form the projection 132a to avoid light rays of the light source passing through the separation line 132 and entering into the backlight module. The bend line can be an arc, a curve, and so on, where the angle of the arc can be large, and the arc can comprise more sub-arcs connected to each other. The curve can have more corners. The light rays can be blocked using malposition between the middle portion and the side portions of the two sides of the separation line 132. The bend line can have two or more right angles, and can also have two or more acute angles and obtuse angles. The light rays can be blocked using malposition between the middle portion and the side portions of the two sides of the separation line 132. The bend line which has two or more right angles is better for blocking light rays and simplifies the manufacturing process.

The above backlight module of the embodiment is mainly used in the phone module.

It should be understood that the present disclosure has been described with reference to certain preferred and alternative embodiments which are intended to be exemplary only and do not limit the full scope of the present disclosure as set forth in the appended claims.

What is claimed is:

1. A backlight module, comprising:
a light guide plate (LGP) comprising an incident surface, an emergent surface, and a reflective surface;
a reflecting plate arranged on the reflective surface of the LGP to reflect light rays transmitted by the LGP to the emergent surface of the LGP;
a diffuser arranged on the emergent surface of the LGP to diffuse emergent light of the LGP;
a prismatic lens group arranged on an emergent surface of the diffuser,
a rim tape layer arranged around the emergent surface of the LGP;
a light source arranged on the incident surface of the LGP;
a flexible printed circuit board electrically connected to the light source to control the light source, wherein the flexible printed circuit board is arranged between the light source and the rim tape layer,
a sealant arranged on an outside of the light source, wherein a first side of the sealant is fixed to an edge of the reflecting plate, and a second side of the sealant is fixed to an edge of the rim tape layer; and
a shading layer arranged between the diffuser and the rim tape layer, and arranged on an outside of the prismatic lens group, wherein the shading layer corresponds to an incident surface of the diffuser, the shading layer comprises a middle portion and side portions separated from the middle portion, a length of the middle portion is greater than lengths of the side portions, each of the side portions are fixed on two sides to the diffuser and the rim tape layer, respectively, and the middle portion is fixed on only one side, the one side of the middle portion being fixed to the rim tape layer, wherein the side portions comprise a first side portion and a second side portion arranged on two sides of the middle portion, respectively, wherein the side portions correspond to edges of the diffuser; a glue layer is disposed on a side of the side portions corresponding to the diffuser, and fixes and adheres the diffuser; one of a plurality of separation lines is arranged between the middle portion and one of the side portions, while another of the plurality of separation lines is arranged between the middle portion and another of the side portions, and a projection is arranged on a side of each of the plurality of separation lines to block light rays.

2. A backlight module, comprising:
a light guide plate (LGP) comprising an incident surface, an emergent surface, and a reflective surface;
a reflecting plate arranged on the reflective surface of the LGP to reflect light rays transmitted by the LGP to the emergent surface of the LGP;
a diffuser arranged on the emergent surface of the LGP to diffuse emergent light of the LGP;
a prismatic lens group arranged on an emergent surface of the diffuser,
a rim tape layer arranged around the emergent surface of the LGP;
a light source arranged on the incident surface of the LGP;
a flexible printed circuit board electrically connected to the light source to control the light source, wherein the flexible printed circuit board is arranged between the light source and the rim tape layer,
a sealant arranged on an outside of the source light, wherein a first side of the sealant is fixed to an edge of the reflecting plate, and a second side of the sealant is fixed to an edge of the rim tape layer; and
a shading layer arranged between the diffuser and the rim tape layer, and arranged on an outside of the prismatic lens group, wherein the shading layer corresponds to an incident surface of the diffuser, the shading layer comprises a middle portion and side portions separated from the middle portion, a length of the middle portion is greater than lengths of the side portions, each of the side portions are fixed on two sides to the diffuser and the rim tape layer, respectively, and the middle portion is fixed on only one side, the one side of the middle portion being fixed to the rim tape layer.

3. The backlight module as claimed in claim 2, wherein the side portions comprise a first side portion and a second side portion arranged on two sides of the middle portion, respectively.

4. The backlight module as claimed in claim 2, wherein the side portions correspond to edges of the diffuser.

5. The backlight module as claimed in claim 2, wherein a glue layer is disposed on a side of the side portions corresponding to the diffuser, and fixes and adheres the diffuser.

6. The backlight module as claimed in claim 2, wherein one or more cutting line along a long edge of the diffuser is arranged on the incident surface of the diffuser, and the diffuser is divided on each of two sides of the cutting line.

7. The backlight module as claimed in claim 2, wherein the shading layer is a black polyethylene terephthalate (PET) layer.

8. The backlight module as claimed in claim 2, wherein one of a plurality of separation lines is arranged between the middle portion and one of the side portions, while another of the plurality of separation lines is arranged between the middle portion and another of the side portions, and a projection is arranged on a side of each of the plurality of separation lines to block light rays.

9. The backlight module as claimed in claim 2, further comprising a separation line being a bend line.

10. A display device, comprising: a backlight module, wherein the backlight module comprises: a light guide plate (LGP) comprising an incident surface, an emergent surface, and a reflective surface;
a reflecting plate arranged on the reflective surface of the LGP to reflect light rays transmitted by the LGP to the emergent surface of the LGP;
a diffuser arranged on the emergent surface of the LGP to diffuse emergent light of the LGP;
a prismatic lens group arranged on an emergent surface of the diffuser,
a rim tape layer arranged around the emergent surface of the LGP;
a light source arranged on the incident surface of the LGP;
a flexible printed circuit board electrically connected to the light source to control the light source, wherein the flexible printed circuit board is arranged between the light source and the rim tape layer,
a sealant arranged on an outside of the source light, wherein a first side of the sealant is fixed to an edge of the reflecting plate, and a second side of the sealant is fixed to an edge of the rim tape layer, and a shading layer arranged between the diffuser and the rim tape layer, and arranged on an outside of the prismatic lens group, wherein the shading layer corresponds to an incident surface of the diffuser, the shading layer comprises a middle portion and side portions separated from the middle portion, a length of the middle portion is greater than lengths of the side portions; each of the side portions are fixed on two sides to the diffuser and the rim tape layer, respectively, and the middle portion is fixed on only one side, the one side of the middle portion being fixed to the rim tape layer.

11. The display device as claimed in claim 10, wherein the side portions comprise a first side portion and a second side portion arranged on two sides of the middle portion, respectively.

12. The display device as claimed in claim 10, wherein the side portions correspond to edges of the diffuser.

13. The display device as claimed in claim 10, wherein a glue layer is disposed on a side of the side portions corresponding to the diffuser, and fixes and adheres the diffuser.

14. The display device as claimed in claim 10, wherein one or more cutting line along a long edge of the diffuser is arranged on the incident surface of the diffuser, and the diffuser is divided on each of two sides of the one or more cutting line.

15. The display device as claimed in claim 10, wherein the shading layer is a black polyethylene terephthalate (PET) layer.

16. The display device as claimed in claim 10, wherein one of a plurality of separation lines is arranged between the middle portion and one of the side portions, while another of the plurality of separation lines is arranged between the middle portion and another of the side portions, and a projection is arranged on a side of each of the plurality of separation lines to block light rays.

17. The display device as claimed in claim 16, wherein at least one of the plurality of separation lines is a bend line.

18. The display device as claimed in claim 10, further comprising: a display module connected to the backlight module, wherein the display module comprises:
   a first polarizer connected to the rim tape layer of the backlight module;
   an array substrate connected to a side of the first polarizer away from the rim tape layer;
   a color filter substrate connected to a side of the array substrate away from the first polarizer, and
   a second polarizer connected to a side of the color filter substrate away from the array substrate.

* * * * *